(12) United States Patent
Forsyth et al.

(10) Patent No.: US 11,550,788 B2
(45) Date of Patent: Jan. 10, 2023

(54) DATA INVESTIGATION AND VISUALIZATION SYSTEM

(71) Applicant: NOBLIS, INC., Reston, VA (US)

(72) Inventors: Kyle Nicolas Forsyth, Fairfax, VA (US); Mark Jason Sanders, Reston, VA (US); Adam Keith Korobow, Bristow, VA (US); Eric Richard McCabe, Reston, VA (US); Mychal William Ivancich, Reston, VA (US); David Michael Peters, Ashburn, VA (US); Cody Steven Jenkins, Mount Clare, WV (US)

(73) Assignee: NOBLIS, INC., Reston, VA (US)

( * ) Notice: Subject to any disclaimer, the term of this patent is extended or adjusted under 35 U.S.C. 154(b) by 0 days.

(21) Appl. No.: 17/125,134

(22) Filed: Dec. 17, 2020

(65) Prior Publication Data

US 2021/0365453 A1 Nov. 25, 2021

Related U.S. Application Data

(60) Provisional application No. 63/029,033, filed on May 22, 2020.

(51) Int. Cl.
*G06F 16/2453* (2019.01)
*G06F 16/901* (2019.01)
*G06N 20/00* (2019.01)
*G06F 16/28* (2019.01)

(52) U.S. Cl.
CPC .. *G06F 16/24542* (2019.01); *G06F 16/24532* (2019.01); *G06F 16/288* (2019.01); *G06F 16/9024* (2019.01); *G06N 20/00* (2019.01)

(58) Field of Classification Search
CPC ............ G06F 16/24542; G06F 16/288; G06F 16/24532; G06F 16/9024; G06N 20/00
See application file for complete search history.

(56) References Cited

U.S. PATENT DOCUMENTS

| 10,606,866 | B1* | 3/2020 | Funk | G06F 16/284 |
| 2012/0078951 | A1* | 3/2012 | Hsu | G06F 16/24532 |
| | | | | 707/769 |
| 2017/0091673 | A1* | 3/2017 | Gupta | G06N 20/00 |
| 2017/0243132 | A1* | 8/2017 | Sainani | G06N 20/00 |
| 2018/0096035 | A1* | 4/2018 | Kreutzer | G06F 16/9024 |
| 2019/0108226 | A1* | 4/2019 | Boxwell | G06F 16/24575 |
| 2019/0129781 | A1* | 5/2019 | Uchiumi | G06F 11/079 |

(Continued)

*Primary Examiner* — Aleksandr Kerzhner
*Assistant Examiner* — Fernando M Mari Valcarcel
(74) *Attorney, Agent, or Firm* — Morrison & Foerster LLP

(57) ABSTRACT

Data investigations are performed by querying a plurality of data sources. A system receives an investigation input and queries a plurality of data sources in accordance with the received input. The system receives, in response to the querying, response data from the plurality of data sources, and generates and stores a data structure representing relationships between the first investigation input and the first response data. The data structure may be in the form of a knowledge graph. The system may generate and display a visualization of the data structure. The system may generate and store a record of investigation steps used to generate the data structure, such that the investigation steps may be applied in future instances, for example using different inputs, to generate new data structures.

15 Claims, 4 Drawing Sheets

(56) References Cited

U.S. PATENT DOCUMENTS

| | | |
|---|---|---|
| 2019/0347668 A1* | 11/2019 | Williams ............ H04L 67/2833 |
| 2020/0104849 A1* | 4/2020 | Cai ........................ G06Q 40/00 |
| 2020/0110746 A1* | 4/2020 | Lecue ..................... G06F 17/11 |
| 2020/0117737 A1* | 4/2020 | Gopalakrishnan ........................... G06F 16/2455 |

* cited by examiner

DATA INVESTIGATION AND VISUALIZATION SYSTEM

CROSS-REFERENCE TO RELATED APPLICATIONS

This application claims the priority of U.S. Provisional Application No. 63/029,033, filed May 22, 2020, the entire contents of which are incorporated herein by reference.

FIELD OF THE DISCLOSURE

This relates to data investigation systems, and, more particularly, to data investigation systems comprising a visualization tool.

BACKGROUND OF THE DISCLOSURE

Data investigation tools can be used in a number of industries and fields to glean insights from information about relationships between different entities, organizations, persons, events, and other data. For example, in the cyber-security space, data investigation tools can allow a cyber-analyst to make decisions about a particular website, IP address, server, network node, or the like, based on information that is available from one or more data sources regarding (or related to) the entity being investigated. Analysts performing investigations based on one or more available data sources may manually correlate information, discern relationships, and gather insights about entities, events, and relationships between said entities and/or events. These investigations may be used to help an analyst identify and characterize cyber-threats, for example.

SUMMARY OF THE DISCLOSURE

As described above, analysts performing investigations based on data available from one or more data sources currently have to manually query and retrieve data from the various different data sources, and have to manually correlate information, discern relationships, and gather insights about entities and events and the manner in which they are related to one another. Performing investigations in this manner can be labor-intensive, imprecise, difficult to scale, non-exhaustive, difficult to document, and difficult to accurately reproduce (e.g., when new information is introduced to the system, or when it is desired that a new entity be investigated in a similar manner as a previous entity). Thus, there is a need for improved systems, methods, and techniques for performing investigations (e.g., cyber-investigations) of data sources.

Accordingly, provided herein are data investigation systems and methods that may address one or more of the needs explained above. The data investigation systems, methods, and techniques disclosed herein may allow for automatic and efficient querying of multiple data sources, accurate tracking of investigation steps for documentation and/or reproduction, and real-time and intuitive visualization of investigation steps and results. In some embodiments, data investigation systems provided herein may allow for tracking steps of an investigation and for automatically determining, documenting, and visualizing characteristics about entities and events and relationships between said entities and events, wherein the investigation results may be based on different forms of information available from a plurality of different data sources.

In some embodiments, the plurality of different data sources included in the system may be configured to be accessed by an investigation tool of the system using a plurality of respective microservices that enable automatically configuring and passing queries to an associated data source and automatically configuring and passing response data back from said associated data source. The microservices may allow a user to efficiently query data sources in parallel or in series and without needing to manually configure a query in a different manner for different data sources. Using microservices to integrate different respective data sources into the system may allow the system to be modularly configured and updated, such that data sources may be migrated into or out of the system without requiring system-level changes to be made.

Additionally, systems and methods provided herein can provide a visualization tool (i.e., a visualization engine) that generates and displays an interactive visual depiction of the relationships amongst the entities, events, or other information that is the subject of (or related to) the investigation. As explained herein, the system may generate and store a data structure representing the results of the investigation (e.g., a knowledge graph depicting entities as nodes and relationships as links between nodes) and may generate a visual representation of the data structure to be displayed to a user of the system. In some embodiments, the data structure (and the associated visualization thereof) may be updated stepwise with each new investigation step (e.g., query) that is added by a user of the system, including by generating and displaying new nodes in a visualization and/or new links between nodes. In some embodiments, the data structure (and the associated visualization thereof) may be updated as new information becomes available from one or more data sources accessible by the system.

As explained herein, the data investigation systems, methods, and techniques disclosed herein may minimize the labor required by manual data investigation processes. By automating the investigation process across various data sources and by automatically generating and visualizing data structures depicting relationships between entities, the labor and time required to correlate different types of information may be decreased. Furthermore, accuracy, comprehensiveness, and persistence of data investigations may be improved, as well as the ability to retrace, recreate, and/or adapt data investigations for future review and/or re-use.

In some embodiments, an investigative inquiry can be saved, such that the specific steps of the inquiry may be stored and may be examined, shared, re-executed, and/or modified at a future time. In some embodiments, an investigative inquiry may be saved and automated for future use, for example by being applied in a modified manner to a same entity, or by being applied in a same or modified manner to a different entity or set of entities.

In some embodiments, a method for performing a data investigation by querying a plurality of data sources is provided, the method performed at a system comprising one or more processors, the method comprising: receiving, at a query controller, a first investigation input; querying, by the query controller, a plurality of data sources in accordance with the first investigation input; receiving, in response to the querying in accordance with the first investigation input, first response data from the plurality of data sources; generating and storing, based on the first response data, a data structure representing relationships between the first investigation input and the first response data.

In some embodiments of the method, the query controller is configured to determine, based on the first investigation input, a first data source of the plurality of data sources to query.

In some embodiments of the method, querying the first data source comprises transmitting a first respective query data to a first data source of the plurality of data sources.

In some embodiments of the method, the first response data comprises data of a first type from a first data source of the plurality of data sources and data of a second type from a second data source of the plurality of data sources.

In some embodiments of the method, the first investigation input comprises an indication of a first entity, and wherein the first response data comprises an indication of a second entity related to the first entity.

In some embodiments of the method, the first response data comprises data regarding a relationship between the first entity and the second entity.

In some embodiments of the method, the first response data comprises a characteristic of the first entity.

In some embodiments of the method, the data structure comprises a knowledge graph.

In some embodiments of the method, the method comprises generating and displaying a visual representation of the data structure representing the relationships between the first investigation input and the first response data.

In some embodiments of the method, the method comprises generating and storing a record of a first set of investigation steps used to generate the data structure, wherein the first set of investigation steps comprises the first investigation input.

In some embodiments of the method, generating and storing the record comprises generating and storing instructions for applying the first set of investigation steps to a plurality of different entities to generate a plurality of respective data structures.

In some embodiments of the method, the method comprises training a machine learning algorithm based on the plurality of respective data structures.

In some embodiments of the method, the method comprises receiving an input, based on the record, comprising instructions to modify one or more of the investigation steps to modify the data structure.

In some embodiments of the method, modifying one or more of the investigation steps comprises undoing an investigation step.

In some embodiments of the method, the method comprises: receiving, at the query controller, a second investigation input, wherein the second investigation input comprises an indication of all or part of the first response data; querying, by the query controller, the plurality of data sources in accordance with the second investigation input; receiving, in response to the querying in accordance with the second investigation input, second response data from the plurality of data sources; augmenting, based on the second response data, the data structure such that the data structure represents relationships between the second investigation input and the second response data.

In some embodiments of the method, the second investigation input comprises an indication of an entity included in the first response data.

In some embodiments of the method, the method comprises generating and storing a record of a first set of investigation steps used to generate the data structure, wherein the first set of investigation steps comprises the first investigation input and the second investigation input.

In some embodiments, a system for performing a data investigation by querying a plurality of data sources is provided, the system comprising one or more processors configured to execute instructions to cause the system to: receive, at a query controller of the system, a first investigation input, query, by the query controller, a plurality of data sources in accordance with the first investigation input; receive, in response to the querying in accordance with the first investigation input, first response data from the plurality of data sources; generate and store, based on the first response data, a data structure representing relationships between the first investigation input and the first response data.

In some embodiments, a non-transitory computer-readable storage medium for performing a data investigation by querying a plurality of data sources is provided, the non-transitory computer-readable storage medium storing instructions configured to be executed by a system comprising one or more processors to cause the system to: receive, at a query controller of the system, a first investigation input; query, by the query controller, a plurality of data sources in accordance with the first investigation input; receive, in response to the querying in accordance with the first investigation input, first response data from the plurality of data sources; and generate and store, based on the first response data, a data structure representing relationships between the first investigation input and the first response data.

In some embodiments, any one or more of the features or aspects of any of the embodiments recited above may be combined in whole or in part with one another, and/or may be combined in whole or in part with any other feature or aspect disclosed herein.

BRIEF DESCRIPTION OF THE FIGURES

Various embodiments are described with reference to the accompanying figures, in which.

DETAILED DESCRIPTION OF THE DISCLOSURE

Described herein are data investigation systems and methods. In particular, provided are systems and methods for performing investigations (e.g., cyber investigations) by querying a plurality of data sources and constructing and visualizing a data structure such as a knowledge graph. Systems and methods provided may enable users to leverage a plurality of different data sources to extract data responsive to an investigation input, and to use the extracted data to construct a data structure depicting entities relevant to the investigation and relationships amongst said entities. In addition to providing real-time visualization of said data structure to guide users in determining what investigation steps should be undertake next, the system may also store metadata regarding the investigation steps and data sources used. Taken together, the data structure and metadata may provide an investigation documentation, trace-back, and automation tool allowing investigators to revisit, modify, update, re-apply, and of generalize data investigation steps for widespread and/or automated future application.

Figure 1:
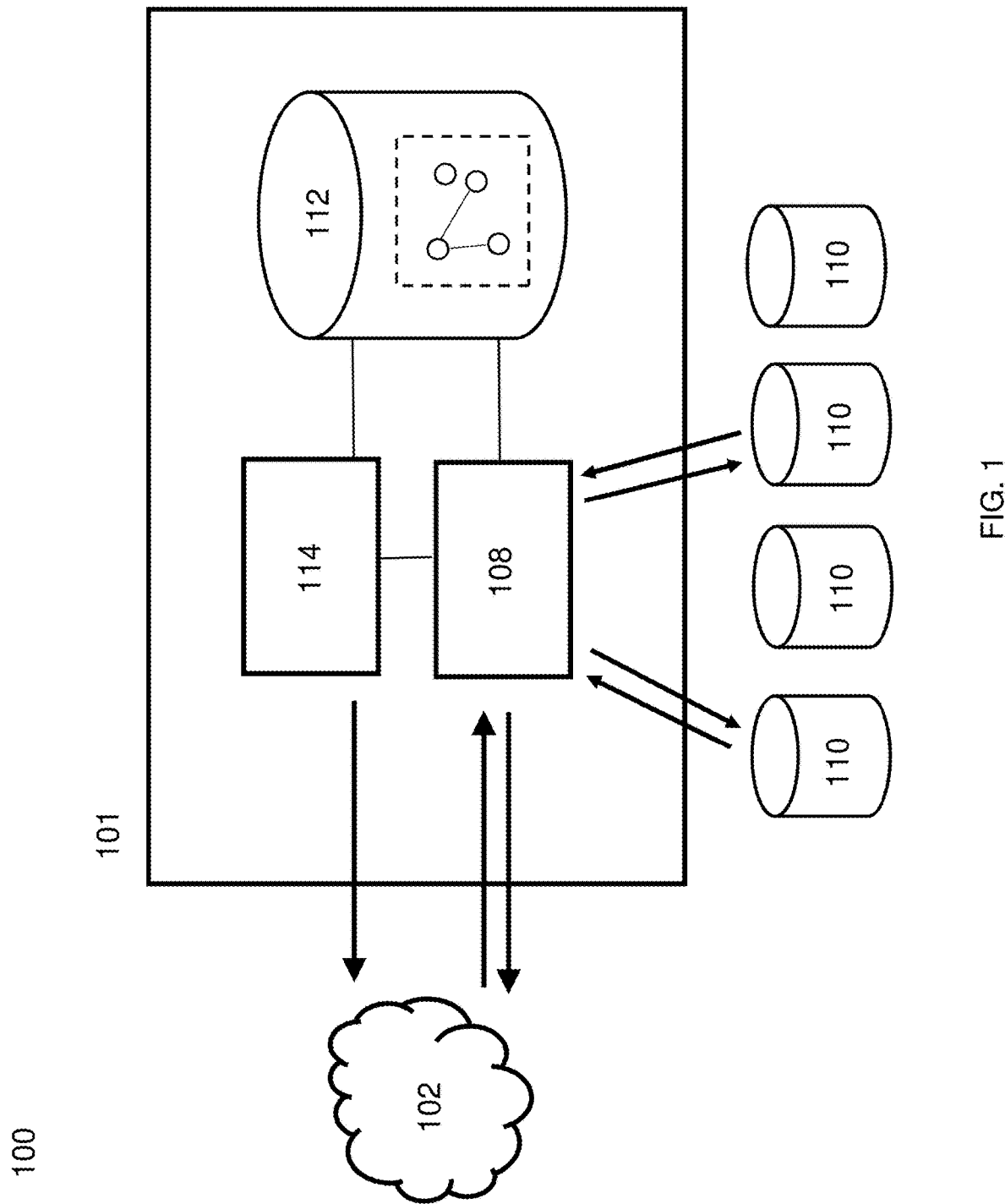
FIG. 1 depicts a data investigation system, according to some embodiments.

FIG. 1 depicts a data investigation system 100, according to some embodiments. Data investigation system 100 comprises data investigation tool 101 that can comprise any computer, processor, server, etc. that is configured to execute a method of data investigation (i.e., a method of querying a plurality of data sources) as described herein. Data investigation tool 01 may comprise query controller 108, data structure storage 112, and visualization engine 114, as described further below. In some embodiments, data investigation system 100 can include requestor 102 (e.g., a user, user device, and/or user system), which may be communicatively coupled (e.g., by wired or wireless network communication) with data investigation tool 101. In some embodiments, data investigation system may further comprise a plurality of data sources 110, each of which may be communicatively coupled (e.g., by wired or wireless network communication) with data investigation tool 101.

As described previously, requestor 102 may initiate an investigation using system 100 by transmitting on or more inputs to tool 101. Requestor 102 (which may be a user, user device, and/or user system, such as an investigator manually entering inputs into an interface provided by data investigation tool 101) can provide an investigation input to data investigation tool 101. An investigation input may be any request for information from one or more of data sources 110. In some embodiments, an investigation input may include a reference to one or more entities, such as an input that requests information about a specific entity. In the example of cyber investigations, an entity that is the subject of (or otherwise included in) an input from a requestor may include an IP address, a domain, a user ID, geographic coordinates, or the like. For example, a requestor may provide an input that seeks to determine what IP addressed have accessed a certain domain in a given time period; in this example, the certain domain is an entity that is the subject of the requester's inquiry. In some embodiments, a query may include a reference to one or more entities represented in the data structure.

Specifically, an investigation input provided by requestor 102 may be received at query controller 108 of tool 101. Query controller 108 may configured to receive investigation inputs and generate, based the investigation input, one or more queries to be transmitted to one or more of the data sources 110. In some embodiments, controller 108 may be configured to generate query data to be transmitted to one or more of the data sources 110. In some embodiments, query controller 108 is configured to transmit query data representative of the investigation input to the one or more data sources configured to receive information of a type that corresponds to an information type of investigation input.

In some embodiments, query controller 108 is configured to format data of the investigation input. For example, when a requestor 102 provides an investigation input to the system, query controller 108 is configured to format the investigation input and/or an entity representing the investigation input such that it may be received and processed by one or more data source. In some embodiments, different data sources may require a different format to properly process the investigation input information. When query controller 108 is configured to format the investigation input/entity, this prevents requestor 102 from having to format the input in different ways for each of the different data sources. Thus, requestor 102 may only need to input the investigation input in a single format (e.g., a single query language, natural language, etc.) and query controller 108 can translate the investigation input into the specific data format that is required for each respective data source.

In some embodiments, the query data may be configured in a format required to be usable with and/or processed by one or more of the data sources. Controller 108 may apply one or more predefined rules to determine which of the data sources 110 to query based on the input received, and to determine how query data should be formatted for each of the different data sources 110. In some embodiments, controller 108 may apply logic to determine which one or more data sources of the plurality of data sources 110 to query, how to query one of more of the data sources 110, when to query one of more of the data sources 110, and/or in what order to query to query one of more of the data sources 110. Any one or more of these determinations may be based on the investigation input provided by requestor 102. Thus, requestor 102 may not need to specify which data sources to query, and query controller 108 can adaptively determine how to query one or more data sources to retrieve the information that requestor 102 is requesting.

In some embodiments, generating query data to be transmitted to one or more of the data sources 110 may comprise extracting one or more entities from the received input. To this end, controller 108 may be configured to identify and extract one or more entities indicated by the input received and to generate the query data based at least in part on the entity or entities identified and extracted. In some embodiments, the identity and/or type of one or more entities identified may be used by controller 108 to determine which of the one or more data sources 110 to query and/or how to generate and format query data for one or more of the data sources 110.

In some embodiments, one or more entities identified in and/or extracted from received input may be used by controller 108 to generate, augment, and/or update the data structure (e.g., knowledge graph) representative of the investigation, as discussed further below. For example, controller 108 may generate data that represents the identified entity as a node in the data structure.

Data sources 110 may comprise any one or more data store or microservices, provided internal or external to tool 101, configured to provide information about entities and/or relationships that may be used to conduct an investigation using system 100. In some embodiments, one or more of data sources 110 may utilize one or more services to identify and look up information that may be pertinent to a query that is executed against the data source. For example, background services that may be used include WHOIS, DIG, and passive Domain Name System (DNS). WHOIS is a domain name search database, DIG is a domain name system lookup, and passive Domain Name System is a system of record that stores DNS resolution data for a given location, record, and time period.

In some embodiments, one or more of data sources 110 may comprise standard REST interfaces and may run locally, or may be provided by an off-site third party and/or commercial information providers. In some embodiments, broker services may provide non-attribution, query fuzzing, credential rotation, and other requirements, particularly if additional operations security (OPSEC) is required. In some embodiments, one or more of data sources 110 may be provided external to tool 101, whereas one or more of data sources 110 may be provided internal to tool 101.

In some embodiments, data investigation system 100 can use the plurality of data sources 110 as "plug-ins." As "plug-ins," data sources 110 may align to a dynamic constraint ontology, supporting a user-facing interactive graphical/visual application (e.g., generating ad visually representing a data structure such as a knowledge graph). In some embodiments, this visual application may provide fine-grained automation that greatly simplifies information retrieval.

Returning to the query data generated by controller 108 for transmission to one or more of the data sources 110, the one or more data sources 110 may be configured to receive the query data generated based on the investigation input. In response to receiving query data from controller 108, the one or more data sources 110 may generate and transmit response data back to query controller 108, wherein the response data is generated from the content stored in the data structure and is based on the content of the query data received (including by being based on one or more entities that may be referenced in the query data received).

In some embodiments, the response data generated and transmitted by one or more data sources 110 may comprise one or more entities that are responsive to the query data; for example, if a query inquires as to what IP addressed have accessed a certain domain, the a responsive data source may generate response data comprising a plurality of IP addresses, each of which may be represented as an entity in the data structure representative of the investigation.

In some embodiments, the response data generated and transmitted by one or more data sources 110 may comprise characteristics about one or more entities. For example, query data may include an identification of an entity, and the response data may include additional information about that entity.

In some embodiments, the response data generated and transmitted by one or more data sources 110 may comprise information about a relationship between a set of entities (sometimes including one or more entities referenced in query data transmitted to the data source, and/or one or more entities included in the response data). Relationship data may, in some embodiments, comprise any information about a relationship between entities, such as the nature of a relationship, time/place of contact between entities, time of communication between entities, content of communication between entities, length of relationship, type of relationship, manner in which entities have interacted, content of interactions, relationships within one or more organizations, relationships within one or more physical or network structures, whether a relationship is persistent or temporary, a quantification of a strength of a relationship, information regarding whether and how the strength of the relationship has changed over time or should be changed over time in the future, and/or a categorization of the relationship into one or more predefined categories of relationship type.

In some embodiments, response data from the one or more data sources 110 is a type of information that is different than a type of information included in the investigation input and/or the query data. For example, if an entity referenced in the investigation input is an IP address, associated response data may comprise one or more metrics or characteristics about the IP address; identification of one or more related entities such as domains, geographic locations, persons, organizations, etc.; and/or information about the relationships of the IP address to the one or more related entities.

Once controller 108 has received response data from one or more of the data sources 110, query controller 108 may format, normalize, or otherwise reconfigure the received response data. In some embodiments, controller 108 may be configured to be able to receive response data in different data formats from different data sources and to be able to normalize the different data formats such that all of the response data may be used in a single application, including in the construction of a single data structure (e.g., knowledge graph) representing an investigation, as discussed further herein.

Once controller 108 has received (and optionally reformatted or configured) response data from one or more of the data sources 110, controller 108 may generate, augment, or update the data structure representative of the investigation being performed. As shown in FIG. 1, controller 108 may generate and store said data structure in data structure storage 112, which may be any suitable computer storage medium. In some embodiments, said data structure may be any data representation of entities, entity characteristics, and entity relationships related to the investigation being performed. In some embodiments, said data structure may be a knowledge graph data structure in which entities are represented as nodes in the knowledge graph and in which relationships between entities are represented as links between nodes.

In addition to information about entities, entity characteristics, and entity relationships, said data structure may also include (or be stored in association with) metadata regarding the investigation being performed. Metadata may include, in some embodiments, information about investigation inputs used; information about data sources used; timestamps for inputs, query data, and/or response data, information about one or more requestors performing the investigation, and/or information about an order in which investigation steps were performed. By storing entity and relationship information along with metadata about the investigation itself, system 100 may provide a documentation and trace-back system that allows users to transparently see and explore the manner in which investigation results were generated.

After the data structure representing the investigation has been generated and stored on storage 112, visualization engine 114 may generate and provide a visual representation of the data structure. In some embodiments, visualization engine 114 may receive a data structure from data structure storage 112. Visualization engine 114 can then use the data stored on data storage 112 to generate a visual representation of the data structure. A visual representation of the data structure may visually represent information about entities and relationships between entities in the form of nodes (representing entities) and connecting lines between nodes (representing relationships between the nodes to which a line connects).

In some embodiments, the visual representation generated by visualization 114 may represent characteristics of an entity via the manner (e.g., size, shape, color, position, etc.) in which a node in the visual representation is depicted. In some embodiments, the visual representation generated by visualization 114 may represent characteristics of a relationship between entities via the manner (e.g., line length, line weight, line shape, line direction, line dashing, line color, line end-caps (e.g., arrows), etc.) in which a link in the visual representation is depicted. In some embodiments the visual representation may comprise one or more data labels for a node and/or link.

In some embodiments the visual representation generated by visualization 114 may be an interactive visual representation. For example, a user of system 100 to whom the visual representation is displayed may be able to select, highlight, hide, and/or drill-down on one or more portions of the visual representation. For example, a user may be able to highlight all nodes or links of a certain type or having a certain characteristics, may be able to hide nodes or links of a certain type or having a certain characteristics. In some examples, a user may be able to click on or otherwise select one or more elements (e.g., nodes or links) in the visual representation to drill-down on the element, for example by causing the system to display additional information about the selected one or more elements. In some examples, a user may be able to click on or otherwise select one or more elements (e.g., nodes or links) in the visual representation to cause visual representation to display one or more previously-hidden elements of the visual representation that are associated with the selected element(s).

In some embodiments, visualization engine 114 may utilize open source software. For example, visualization engine 114 may use open source programs such as D3.js, Vue.js, or similar services to provide visualization of a data structure, or relationships between different forms of information. D3.js a JavaScript library for producing dynamic, interactive data visualizations in web browsers. Vue.js is an open-source model—view JavaScript framework for building user interfaces and single-page applications.

In some embodiments, other services may be used to collect data and glean information from a stored data structure representing an investigation. This may be data, metadata, or alternative displays of attributes of nodes in the data structure (e.g., graph) or of some part of or the entire data structure (e.g., graph). For example, Roberta is a service that collects information about each node on a knowledge graph. It can display a composite reputation score for each node in a visual graph (e.g., a pie chart). Other services that may be integrated into data investigation systems provided herein can include services that allow a user to provide a screenshot of a website, allow a user to look at a website without visiting it, access and/or provide one or more maps for geolocation, access and/or provide registrant information, and/or additional functions. In some embodiments, one or more of these other services may be provided as part of a supplementary display functionality that may not be part of the primary visual representation of the investigation (e.g., investigation graph display). In some embodiments, information associated with one or more of these other services may be considered supplementary data and/or metadata and may, in some embodiments, be displayed by one or more alternative display functionalities of the system, such as in response to a user clicking on a node of the visual representation to get a geolocation of the selected node on a map, clicking several nodes to see their relative geolocations on a map, or selecting an visual representation of an investigation to see where all nodes are on the graph are located.

In some embodiments, requestor 102 may be able to provide a subsequent investigation input after the first investigation input has been processed by system 100 to create and/or update the data structure and to generate and output a visual representation of the data structure. In some embodiments, a user may be able to view the data structure after providing one input, and then decide based on viewing the data structure what a next input should be. In this way, the user may conduct an investigation in a step-by-step iterative manner and may be able to see how the visual representation of the data structure grows and evolves with each new investigation input. With each additional input, for example, the data structure may be enriched with additional information about entities and/or relationships already represented in the data structure based on response data from the one or more data structures 110 responsive to query data based on the new investigation input; and/or the data structure may be augmented by the addition of new entities and/or relationships based on response data from the one or more data structures 110 responsive to query data based on the new investigation input.

In some embodiments, controller 102 may execute one or more investigation inputs in an investigation by typing, speaking, ad/or selecting one or more menu options to generate the content of an investigation input. In some embodiments, controller 102 may generate an investigation input by clicking, tapping, or otherwise selecting an element of a data structure representing an existing investigation; for example, a user may be able to click a node on a visual representation of a data structure for an ongoing investigation and may be presented with one or more options for generating an investigation input based on that node (e.g., seeking information from the data sources about entities relating to the entity represented by the node, about relationships of the entity represented by the node, or about characteristics of the entity represented by the node).

In some embodiments, data investigation system 100 may store one or more steps of an investigation in association with (or as a part of) the data structure representing the investigation. For example, the resulting data structure (e.g., knowledge graph) representing the results of the investigation along with any metadata regarding the steps taken during execution of the investigation may be stored, for example on storage 112. In some embodiments, metadata regarding the investigation may be stored such that investigation steps can be revisited and viewed in the future to provide documentation for the manner in which an investigation was conducted. In some embodiments, metadata regarding the investigation may be stored such that investigation steps may be re-executed at a future time, either with or without modification of one or more of the steps. For example, if the content of one or more of data sources 110 changes (e.g., is routinely updates), then investigation steps may be re-executed to update a data structure representing the results of the investigation. In another example, a user may wish to modify one or more steps of an investigation to update (or replace) the data structure representing the investigation results; modifications to an investigation may include adding steps, undoing steps, and/or changing steps of the investigation. In some embodiments, investigation steps of an investigation may be exported and shared with other users and/or other data investigation systems.

In some embodiments, as an investigation proceeds, it may be desirable to transfer collected entity and relationship information (e.g., a data structure) to a system having a higher classification level. This collected data may be transferred to air-gapped deployments. In some embodiments, these air-gapped deployments may include a distinct plurality of data sources or microservices (i.e., different than those of data investigation system 100) that can be used to augment or continue the investigation. In some embodiments, a data structure representing an investigation may be transferred to a system having a higher classification level than system 100 so that the data structure can continue to be augmented and enriched by the new system with data having a higher classification level than the data in data sources 110.

In some embodiments, investigation steps may be stored and configured as executable steps such that the investigation steps may be adapted for application across multiple different entities at a future time. For example, a series of investigation steps initially performed with respect to one entity may be formalized and stored as an algorithmic investigation that is able to be applied to a set of different entities in the future in a similar manner, thereby generating similar data structures representing the results of applying the same algorithmic investigation type to each of the different entities in the set. These different data structures may, in some embodiments, be compared to one another, whether by human comparison (e.g., by a user comparing visual representations of the different visual representations to one another) or by automated algorithmic comparison (e.g., by a system comparing the different data structures to identify differences in similarly-generated knowledge graphs).

In some embodiments, a set of results of investigations generated by applying a same investigation framework/algorithm (e.g., the same or similar investigation steps) to multiple different entities in a set may be used to train one or more machine learning algorithms. That is, a set of data structures (e.g., knowledge graphs) (and/or visual representations thereof) generated by applying an investigation algorithm to various different entities may be used to train a machine learning algorithm.

In some embodiments, some user input may be required or used to create a training set to train a machine learning algorithm. For example, a process for creating and using a data set for training a machine learning algorithm may be as follows: (1) perform an investigation and generate an investigation algorithm formalizing the steps used to perform the investigation; (2) apply the algorithm to reapply the steps of the original investigation to a new set of inputs, thereby performing one or more additional investigations using the same algorithm and generating one or more additional data structures representing the results of the respective additional investigations; (3) manually review (e.g., human review) or algorithmically/automatically/systematically review some of the resulting data structures to assess (e.g., a binary assessment) the results and separate the resulting data structures into two classes; (4) use the data structures from the two separate classes (along with, in some embodiments, associated data from those classes and user input associated with those classes) to train a machine learning model to separate the rest of the data structures (and additional data structures produced using a same or similar investigation algorithm) into the same two classes without manual input or other input aside from the generated machine-learning algorithm. In some embodiments, such a process may be useful to automatically separate data structures that represent malicious activity from those that represent non-malicious activity; this may be done using a machine learning algorithm over a very large set of data structures so that an investigator can save time by only reviewing data structures that are likely to represent malicious activity.

Figure 2:
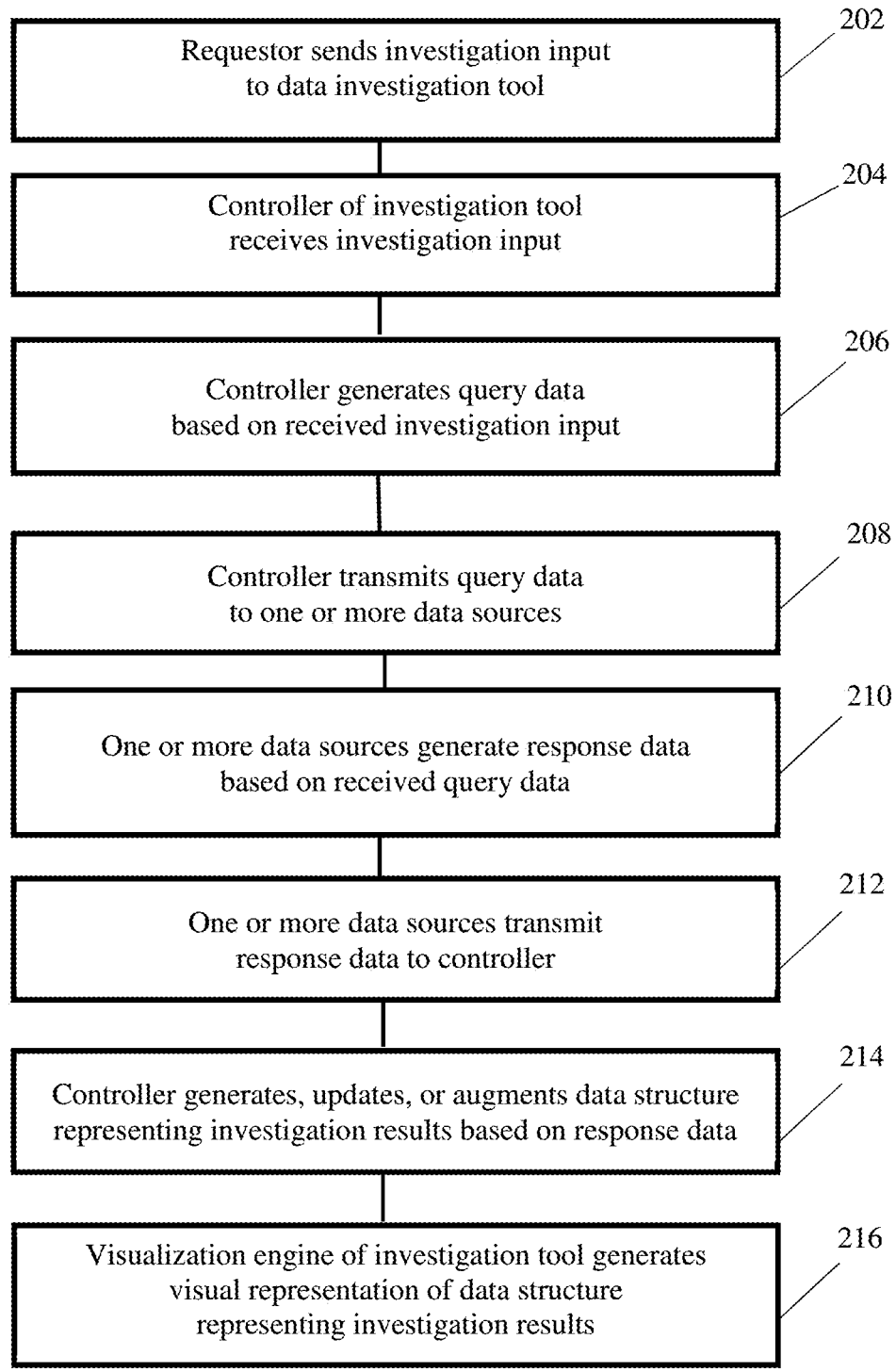
FIG. 2 depicts a flow chart of a method for using a data investigation system, according to some embodiments.

FIG. 2 depicts a flow chart of a method for using a data investigation system, according to some embodiments. As shown, FIG. 2 depicts a method in which a user/requestor uses a data investigation system (e.g., data investigation system 100 of FIG. 1) to perform an investigation by generating visualizing a data structure (e.g., knowledge graph) representing results of the investigation.

At block 202, in some embodiments, a requestor may send an investigation input to a data investigation tool. In some embodiments, this step may include initiating an investigation by providing an investigation input to a data investigation system (e.g., data investigation system 100 of FIG. 1). In some embodiments, as discussed above, the investigation input may indicate one or more entities that may be a subject of the investigation, and may include a request for the system to retrieve information about one or more indicated entities and/or one or more entities related thereto.

At block 204, in some embodiments, the investigation input may be received by a controller (e.g., controller 108 described in FIG. 1 above) of the investigation tool.

At block 206, in some embodiments, the controller may generate query data based on the received investigation input, wherein the query data may represent and reflect the investigation input and may be formatted and configured to be transmitted to and processed by one or more data sources associated with the investigation system. In some embodiments, the controller may be configured to apply logic to format the query data in a manner that can be processed by a specific data source to which it will be sent. In some embodiments, the controller may be configured to apply logic to select, based on the investigation input, one or more data sources to which the query data will be sent.

At block 208, in some embodiments, the controller may transmit the query data to one or more data sources associated with the system (e.g., one or more of data sources 110 as discussed above with respect to FIG. 1). In some embodiments, the controller may be configured to apply logic to send query data to data sources in a manner such that the data sources can efficiently and successfully process the query data, including by scheduling, queuing, parallelizing, and/or automating the transmission of the query data. In some embodiments, this step may comprise querying a plurality of data sources in parallel and/or in series. In some embodiments, this step may comprise sending query data that has been generated in different formats to different data sources depending on which formats are required for each data source.

At block 210, in some embodiments, the one or more data sources may generate response data based on the received query data. As explained above, the generated response data may include an indication of one or more entities, characteristics of one or more entities, an indication of one or more relationships between two entities, and/or characteristics of one or more relationships between entities. The one or more data sources may, in some embodiments, generate the response data by applying the query data against one or more data stores and/or information services accessible via the data source.

At block 212, in some embodiments, the one or more data sources may transmit the generated response data back to the controller. In some embodiments, the data sources may each transmit response data back to the controller in different formats, and the controller may be configured to reformat and/or normalize the response data so that it may be used in generating a data structure representative of the investigation results, as discussed above.

At step 214, in some embodiments, the controller may generate, update, or augment a data structure (e.g., knowledge graph) representing the results of the investigation being performed, wherein the data structure is generated and/or configured based on the response data received from the one or more data sources. In some embodiments, the controller may also generate and store metadata regarding the data structure including information about the investigation input, the query data, the data sources, and/or the response data, such that the metadata an data structure may be used to provide investigation documentation, trace-back, and automation as discussed above. In some embodiments, the controller may store the data structure and/or metadata on a data storage medium of the investigation tool, such as data storage 112 discussed above in FIG. 1.

At step 216, in some embodiments, a visualization engine (e.g., visualization engine 114 described above in FIG. 1) of the system may generate (or update or augment) a visual representation of the data structure representing the investigation results. In some embodiments, the visual representation may be a visual representation of a knowledge graph in which entities are represented as nodes and relationships between entities are represented as lines linking related nodes to one another. In some embodiments, the visual representation may be displayed to a user, such that the user may examine the visual representation and use it to determine a next iterative investigation input (e.g., a next investigation step) to be used to continue to refine, enrich, and/or augment the data structure representing the investigation results.

Figure 3:
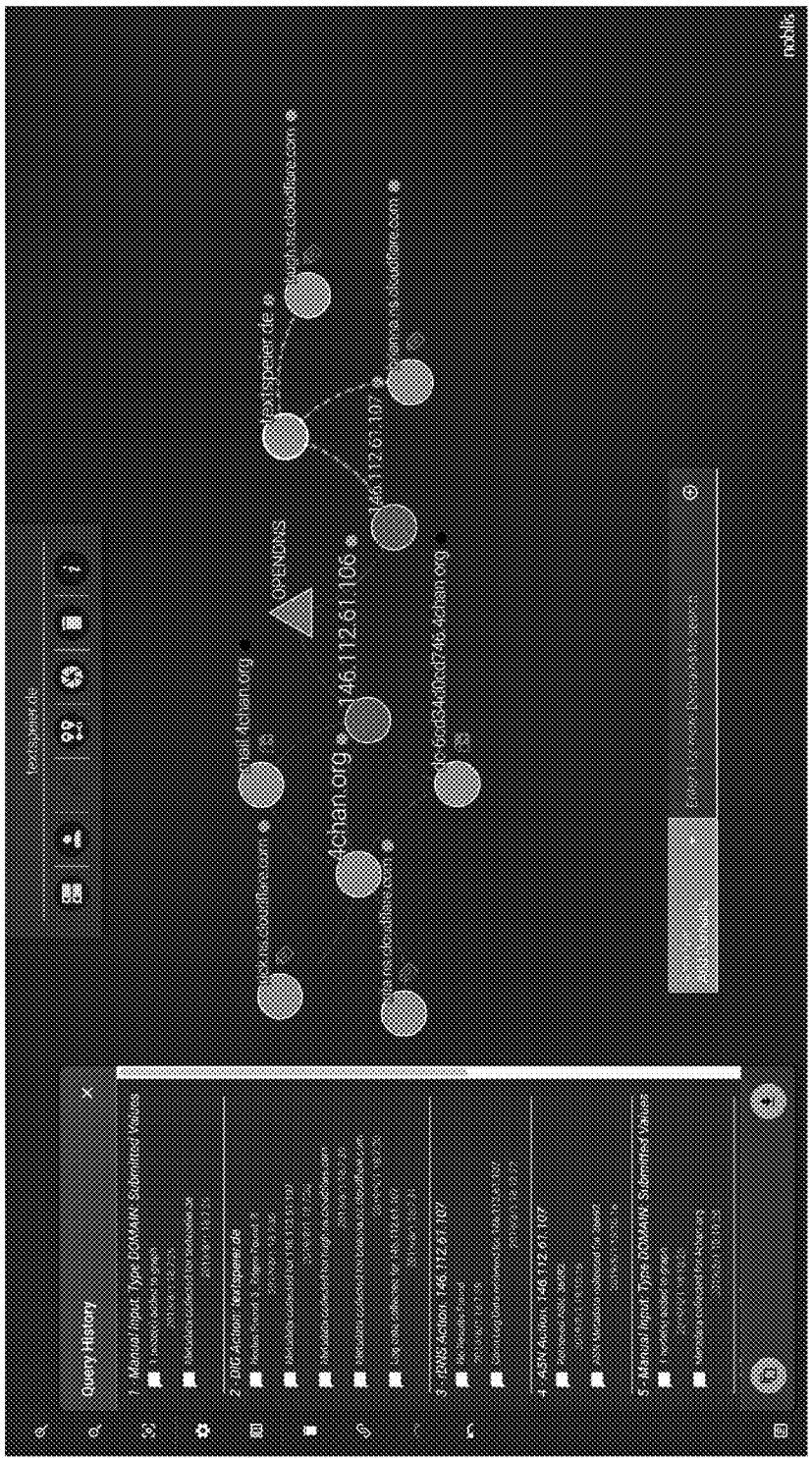
FIG. 3 shows a graphic user interface of data investigation system, according to some embodiments.

FIG. 3 shows a graphic user interface of data investigation system, according to some embodiments. In particular, FIG. 3 depicts a screen of a graphical user interface comprising a visualization of a data structure generated by a data investigation system. As shown in FIG. 3, various entities may be represented by nodes (as shown as circles, as depicted in FIG. 3), and relationships between nodes can be represented by connecting lines. In some embodiments, a user of the graphical user interface may be able to interact with the visual representation of the data structure in order to highlight, expand, or hide one or more nodes or lines of the visual representation. For example, a user can select a node to reveal additional information about the entity of which the node represents, or can select a connecting line to reveal additional information about the relationship of which the connecting line represents. In some embodiments, a user of the graphical user interface may be able to interact with the visual representation in order to execute an additional investigation input in order to continue to update the depicted data structure and the displayed visual representation.

Figure 4:
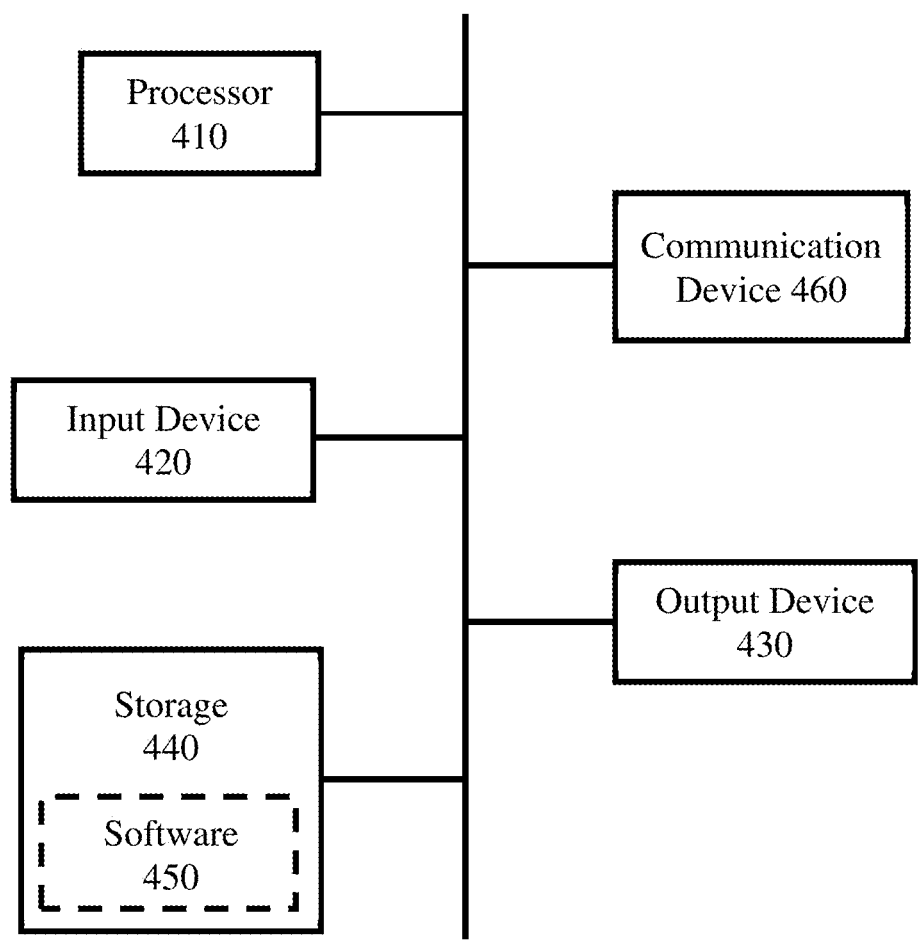
FIG. 4 illustrates a computing device, according to some embodiments.

FIG. 4 illustrates an example of a computer, according to some embodiments. Computer 300 can be a component of data investigation system according to the systems and methods described above, such as system 100 of FIG. 1, or can include the entire system itself. In some embodiments, computer 400 may execute a method for querying a data investigation system.

Computer 400 can be a host computer connected to a network. Computer 400 can be a client computer or a server. As shown in FIG. 4, computer 400 can be any suitable type of microprocessor-based device, such as a personal computer, workstation, server, or handheld computing device, such as a phone or tablet. The computer can include, for example, one or more of processor 410, input device 420, output device 430, storage 440, and communication device 460. Input device 420 and output device 430 can correspond to those described above and can either be connectable or integrated with the computer.

Input device 420 can be any suitable device that provides input, such as a touch screen or monitor, keyboard, mouse, or voice-recognition device. Output device 430 can be any suitable device that provides an output, such as a touch screen, monitor, printer, disk drive, or speaker.

Storage 440 can be any suitable device that provides storage, such as an electrical, magnetic, or optical memory, including a random access memory (RAM), cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can include a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 340, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method for performing a data investigation by querying a plurality of data sources, the method performed at a system comprising one or more processors, the method comprising:
    receiving, at a query controller, a first investigation input;
    querying, by the query controller, a plurality of data sources in accordance with the first investigation input;
    receiving, in response to the querying in accordance with the first investigation input, first response data from the plurality of data sources;
    generating and storing, based on the first response data, a data structure representing relationships between the first investigation input and the first response data, wherein the data structure comprises a knowledge graph;
    generating and storing a record of a first set of investigation steps used to generate the data structure, wherein the first set of investigation steps comprises one or more investigation steps based on the first investigation input;
    in accordance with the stored record of the first set of investigation steps, applying the first set of investigation steps to a plurality of different entities to generate a plurality of respective data structures, such that each of the plurality of respective data structures is representative of applying the first set of investigation steps to a different respective entity of the plurality of different entities;
    training a machine learning algorithm based on the plurality of respective data structures, wherein training the machine learning algorithm based on the plurality of respective data structures comprises training the machine learning algorithm to classify data structures generated using the first set of investigation steps and generated with respect to different respective entities into one or a set of predefined classifications;
    displaying a visual representation of the data structure comprising the knowledge graph;
    receiving, at the query controller, a second investigation input, wherein receiving the second investigation input comprises:
    detecting selection of a node of the visual representation of the knowledge graph;
    in response to detecting the second investigation input comprising selection of the node of the visual representation of the knowledge graph, displaying an indication of a set of options for generating investigation inputs based on the selected node; and
    detecting selection of an option from the set of options for generating investigation inputs based on the selected node;
    in response to receiving the second investigation input, querying, by the query controller, the plurality of data sources in accordance with the second investigation input comprising the indication of the node and the selection of the option;
    receiving, in response to the querying in accordance with the second investigation input, second response data from the plurality of data sources; and
    augmenting, based on the second response data, the data structure such that the data structure represents relationships between the second investigation input and the second response data.

2. The method of claim 1, wherein the query controller is configured to determine, based on the first investigation input, a first data source of the plurality of data sources to query.

3. The method of claim 2, wherein querying the first data source comprises transmitting a first respective query data to a first data source of the plurality of data sources.

4. The method of claim 1, wherein the first response data comprises data of a first type from a first data source of the plurality of data sources and data of a second type from a second data source of the plurality of data sources.

5. The method of claim 1, wherein the first investigation input comprises an indication of a first entity, and wherein the first response data comprises an indication of a second entity related to the first entity.

6. The method of claim 5, wherein the first response data comprises data regarding a relationship between the first entity and the second entity.

7. The method of claim 5, wherein the first response data comprises a characteristic of the first entity.

8. The method of claim 1, comprising generating and displaying a visual representation of the data structure representing the relationships between the first investigation input and the first response data.

9. The method of claim 1, comprising receiving an input, based on the record, comprising instructions to modify one or more of the investigation steps to modify the data structure.

10. The method of claim 9, wherein modifying one or more of the investigation steps comprises undoing an investigation step.

11. The method of claim 1, wherein the second investigation input comprises an indication of an entity included in the first response data.

12. The method of claim 1, comprising generating and storing a record of a first set of investigation steps used to generate the data structure, wherein the first set of investigation steps comprises the first investigation input and the second investigation input.

13. The method of claim 1, comprising: exporting the data structure to a second system comprising one or more processors, wherein the second system is configured to query a second plurality of data sources distinct from the plurality of data sources; and modifying the data structure based on one or more queries of the second plurality of data sources.

14. A system for performing a data investigation by querying a plurality of data sources, the system comprising one or more processors configured to execute instructions to cause the system to:
- receive, at a query controller of the system, a first investigation input,
- query, by the query controller, a plurality of data sources in accordance with the first investigation input;
- receive, in response to the querying in accordance with the first investigation input, first response data from the plurality of data sources;
- generate and store, based on the first response data, a data structure representing relationships between the first investigation input and the first response data, wherein the data structure comprises a knowledge graph;
- generate and store a record of a first set of investigation steps used to generate the data structure, wherein the first set of investigation steps comprises one or more investigation steps based on the first investigation input;
- in accordance with the stored record of the first set of investigation steps, apply the first set of investigation steps to a plurality of different entities to generate a plurality of respective data structures, such that each of the plurality of respective data structures is representative of applying the first set of investigation steps to a different respective entity of the plurality of different entities;
- train a machine learning algorithm based on the plurality of respective data structures, wherein training the machine learning algorithm based on the plurality of respective data structures comprises training the machine learning algorithm to classify data structures generated using the first set of investigation steps and generated with respect to different respective entities into one or a set of predefined classifications;
- displaying a visual representation of the data structure comprising the knowledge graph;
- receiving, at the query controller, a second investigation input, wherein receiving the second investigation input comprises:
  - detecting selection of a node of the visual representation of the knowledge graph;
  - in response to detecting the second investigation input comprising selection of the node of the visual representation of the knowledge graph, displaying an indication of a set of options for generating investigation inputs based on the selected node; and
  - detecting selection of an option from the set of options for generating investigation inputs based on the selected node;
- in response to receiving the second investigation input, querying, by the query controller, the plurality of data sources in accordance with the second investigation input comprising the indication of the node and the selection of the option;
- receiving, in response to the querying in accordance with the second investigation input, second response data from the plurality of data sources; and
- augmenting, based on the second response data, the data structure such that the data structure represents relationships between the second investigation input and the second response data.

15. A non-transitory computer-readable storage medium for performing a data investigation by querying a plurality of data sources, the non-transitory computer-readable storage medium storing instructions configured to be executed by a system comprising one or more processors to cause the system to:
- receive, at a query controller of the system, a first investigation input;
- query, by the query controller, a plurality of data sources in accordance with the first investigation input;
- receive, in response to the querying in accordance with the first investigation input, first response data from the plurality of data sources;
- generate and store, based on the first response data, a data structure representing relationships between the first investigation input and the first response data, wherein the data structure comprises a knowledge graph;
- generate and store a record of a first set of investigation steps used to generate the data structure, wherein the first set of investigation steps comprises one or more investigation steps based on the first investigation input;
- in accordance with the stored record of the first set of investigation steps, apply the first set of investigation steps to a plurality of different entities to generate a plurality of respective data structures, such that each of the plurality of respective data structures is representative of applying the first set of investigation steps to a different respective entity of the plurality of different entities;
- train a machine learning algorithm based on the plurality of respective data structures, wherein training the machine learning algorithm based on the plurality of respective data structures comprises training the machine learning algorithm to classify data structures generated using the first set of investigation steps and generated with respect to different respective entities into one or a set of predefined classifications;
- displaying a visual representation of the data structure comprising the knowledge graph;
- receiving, at the query controller, a second investigation input, wherein receiving the second investigation input comprises:
  - detecting selection of a node of the visual representation of the knowledge graph;
  - in response to detecting the second investigation input comprising selection of the node of the visual representation of the knowledge graph, displaying an indication of a set of options for generating investigation inputs based on the selected node; and
  - detecting selection of an option from the set of options for generating investigation inputs based on the selected node;
- in response to receiving the second investigation input, querying, by the query controller, the plurality of data sources in accordance with the second investigation input comprising the indication of the node and the selection of the option;

receiving, in response to the querying in accordance with the second investigation input, second response data from the plurality of data sources; and augmenting, based on the second response data, the data structure such that the data structure represents relationships between the second investigation input and the second response data.

\* \* \* \* \*